United States Patent
Hampel (10) Patent No.: US 8,824,480 B2
(45) Date of Patent: Sep. 2, 2014

(54) METHOD AND APPARATUS FOR END-HOST BASED MOBILITY, MULTI-HOMING AND MULTIPATH PROTOCOLS

(75) Inventor: Karl Georg Hampel, New York, NY (US)

(73) Assignee: Alcatel Lucent, Boulogne-Billancourt (FR)

( * ) Notice: Subject to any disclaimer, the term of this patent is extended or adjusted under 35 U.S.C. 154(b) by 123 days.

(21) Appl. No.: 13/363,334

(22) Filed: Jan. 31, 2012

(65) Prior Publication Data

US 2013/0194963 A1  Aug. 1, 2013

(51) Int. Cl.
*H04L 12/28* (2006.01)

(52) U.S. Cl.
USPC ........ 370/395.2; 370/230; 370/235; 709/227; 709/228

(58) Field of Classification Search
None
See application file for complete search history.

(56) References Cited

U.S. PATENT DOCUMENTS

| | | | |
|---|---|---|---|
| 8,458,353 B2 * | 6/2013 | Krishnaswamy et al. | 709/231 |
| 2011/0296006 A1 * | 12/2011 | Krishnaswamy et al. | 709/224 |
| 2012/0020284 A1 * | 1/2012 | Haddad | 370/328 |
| 2012/0093150 A1 * | 4/2012 | Kini | 370/389 |
| 2012/0099601 A1 * | 4/2012 | Haddad et al. | 370/401 |
| 2012/0188949 A1 * | 7/2012 | Salkintzis et al. | 370/329 |
| 2012/0331160 A1 * | 12/2012 | Tremblay et al. | 709/228 |
| 2013/0064198 A1 * | 3/2013 | Krishnaswamy et al. | 370/329 |
| 2013/0086142 A1 * | 4/2013 | Hampel et al. | 709/203 |
| 2013/0195004 A1 * | 8/2013 | Hampel | 370/315 |
| 2013/0195106 A1 * | 8/2013 | Calmon et al. | 370/389 |

OTHER PUBLICATIONS

U.S. Appl. No. 13/189,914, filed Jul. 25, 2011, 28 pages.

* cited by examiner

*Primary Examiner* — Donald Mills
(74) *Attorney, Agent, or Firm* — Wall & Tong, LLP (57) ABSTRACT

A method and apparatus for dynamically engaging a network anchor adapted to support communication with one or more end-hosts associated with an Internet Protocol (IP) not supported by the multi-homed source host. are provided.

26 Claims, 6 Drawing Sheets

METHOD AND APPARATUS FOR END-HOST BASED MOBILITY, MULTI-HOMING AND MULTIPATH PROTOCOLS

FIELD OF THE INVENTION

The invention relates generally to communication networks and, more specifically but not exclusively, to anchor for end-host-based mobility, multihoming and multipath protocols.

BACKGROUND

The vast majority of Internet traffic uses stream-based transport protocols such as Transmission Control Protocol (TCP) or Stream Control Transmission Protocol (SCTP). Due to the growing number of end hosts such as smartphones and tablets, which are multi-homed, a variety of protocols have been proposed to improve end-to-end throughput or to enhance connection resilience. Examples for such protocols are Multipath TCP (MPTCP), Multi-connection TCP (MCTCP) and Concurrent Multipath Transfer SCTP (CMT SCTP).

Multipath protocols are usually designed as "end-host-based" protocols, i.e., both end hosts of the connection or session support all signaling needed to establish and tear down the various transport paths. These protocols may operate on various protocol layers. However, to simplify the issues, transport connections are hereafter used for illustration purposes.

End-host-based protocols provide scalability and avoid the need for network-side equipment. However, these protocols exhibit a variety of weaknesses in case one or both end hosts experience a break-before-make mobility event. In such a mobility event, the host has to detach from one network before it may re-attach to another network. For example, some of these weaknesses are (1) if both hosts move to a new Internet Protocol (IP) address at the same time, their signaling messages carrying the update about the respective new IP address would miss each other resulting in connection failure; and (2) if one host moves to a new IP address and the other host resides behind a firewall, the signaling messages of the moving host will be blocked by the firewall. This also results in connection failure. Further, a multi-homed host cannot utilize its multitude of interfaces for multipath operation if the corresponding access networks support different IP protocols, e.g., some access networks support Internet Protocol version 4 (IPv4), other access networks support Internet Protocol version 6 (IPv6), whereas the peer's access network only supports one of these IP protocols. Such situations are very likely to occur with the roll out of IPv6.

SUMMARY

Various deficiencies in the prior art are addressed by embodiments for dynamically engaging a network anchor adapted to support communication with one or more end-hosts associated with an Internet Protocol (IP) not supported by the multi-homed source host.

One embodiment is a method adapted for anchoring a multipath connection between two hosts. Another embodiment is an apparatus. The method includes the steps of: obtaining connection information associated with the multipath connection; establishing a first transport path between the first host and an anchor node using the multipath connection protocol and using the end point identifier of the anchor node as a proxy for the second host; and establishing a second transport path between the anchor node and the second host using the multipath connection protocol and using the end point identifier of the anchor node as a proxy for the first host.

BRIEF DESCRIPTION OF THE DRAWINGS

The teachings herein may be readily understood by considering the following detailed description in conjunction with the accompanying drawings, in which.

To facilitate understanding, identical reference numerals have been used, where possible, to designate identical elements that are common to the figures.

DETAILED DESCRIPTION

Generally speaking, various embodiments discussed herein provide a function for the host to engage a protocol translator or anchor on those interfaces, which use the IP protocol that is not supported by the peer. Thus, while primarily described within the context of a translator/anchor function facilitating traffic flows between one or more end-hosts associated with an Internet Protocol (IP) not supported by the source host, it will be appreciated by those skilled in the art that the invention is applicable to various transport protocol combination, such as facilitating traffic flows between a multipath or flow-based multihoming or mobility protocol. Moreover, the hosts may have only one interface at a time.

The various embodiments contemplate methods, apparatus and the like that provide an anchor function operable to (1) obtain connection-related information from the hosts such as IP addresses/port numbers and connection identifications pertaining to the end hosts. In one embodiment, the connection-related information is obtained from signaling initiated by the end hosts to the anchor. In another embodiment, where the anchor resides on a path used by the end hosts for traffic, the connection-related information is derived from packets exchanged between the end hosts; (2) cache the connection-related information, e.g., IPs, Port numbers of the end hosts and connection identifiers obtained in the above manner; (3) initiate communication with the end hosts. In this embodiment, the anchor may add signaling information, (e.g., its own IP address and port number) to packets passing on the existing connection between both hosts or the anchor inserts its own signaling packets addressed to either of the end hosts; (4) become an end point for a new flow/subflow created by one host and simultaneously creating a new flow/subflow to the other end host. In this embodiment, the incoming packets from source hosts are addressed to the anchor, the anchor replaces the source address/port with its own address/port and the destination address/port, which is set to the anchor's address/port, with that of the destination host's address/port. At the same time it may (but need not) add an offset to the SEQ and ACK numbers.

Mobile IPv6 (MIPv6) represents a (layer 3) L3-mobility solution, which supports end-host based mobility, referred to as "route optimization" (RO), as well as an anchor referred to as "home agent" (HA). MIPv6 requires that one host, referred to as "mobile node" (MN), supports a trust relationship with the HA. Further, HA and MN must exchange data packets via a tunneling protocol. The HA's task is to decapsulate packets arriving from the tunnel or to encapsulate packets arriving from the peer.

The present embodiments do not utilize a tunnel for data packets exchanged between host and anchor. In one embodiment, the anchor applies network address translation instead of de- and encapsulation. In other embodiments, the anchor is an optional feature whereas in MIPv6 operation without HA is not possible. Further, the HA is only engaged if the host does not reside in its home network, i.e., when the HA is not on the path between the mobile node and its peer. This requires additional signaling between MN and HA. In contrast, in the present embodiments the anchor resides on one of the paths established between the end hosts as part of the multipath connection. As a result, the anchor may infer connection-related information from packet inspection and insert packets into an existing connection. Moreover, the present embodiments may be applied to higher layer multipath protocols, e.g., occurring on transport-, session- or application layer. MIPv6 is restricted to L3 operation.

One embodiment is a method for establishing an end-to-end multipath connection with two direct paths with one additional path via the anchor. Various embodiments are directed toward establishing subflow via the anchor in MPTCP.

Generally speaking, the term multipath protocol connection is used herein to represent, illustratively, a connection between hosts supported by multiple concurrent paths, such as a multipath protocol connection, a multihoming protocol connection and/or a mobility protocol connection. An anchor node is adapted to serve as an endpoint for two transport paths (host1-anchor and anchor-host2). It is noted that additional anchor nodes and corresponding transport paths may be used within the context of the various embodiments (e.g., host1-anchor1, anchor1-anchor2, and anchor2-host2).

In one embodiment, an anchor node located outside of the firewall maintains the transport path to host within the firewall as well as the transport path to a host outside of the firewall. In this manner, a connectivity problem associated with the outside host may be addressed without terminating the trusted session through the firewall.

It is noted that hosts using an anchor node or router implementing an anchor function do not need to be multi-homed. The various embodiments apply to mobility protocols where one flow is supported at a time. When this one flow cannot be supported anymore because one of the end hosts moves, the end hosts may establish a new flow directly or via anchor. The latter is done in case there is no direct end-to-end connectivity.

Figure 1:
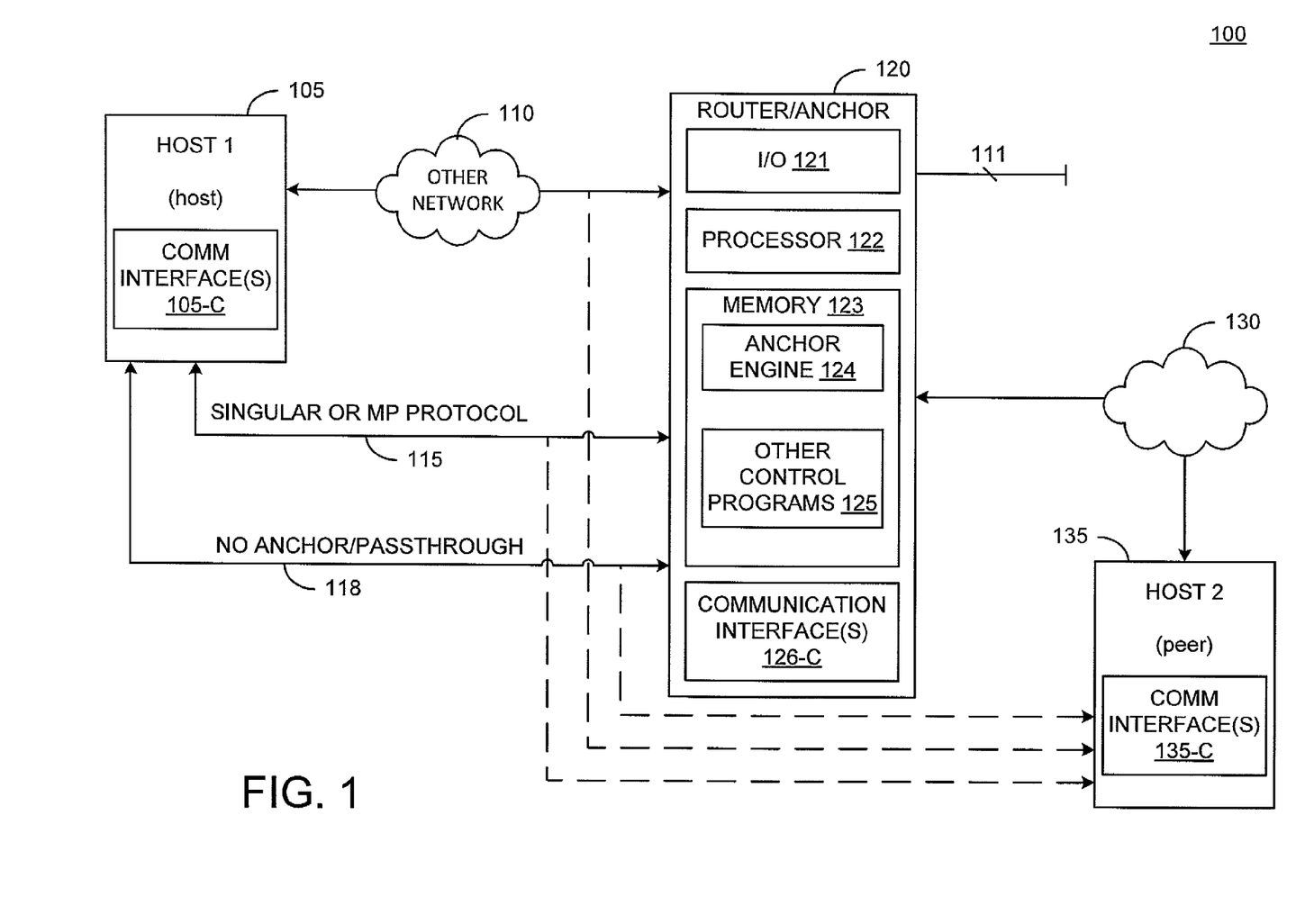
FIG. 1 depicts a high-level block diagram of an apparatus including an exemplary router and anchor function benefiting from an embodiment.

FIG. 1 depicts a high-level block diagram of an apparatus including an exemplary router with an anchor function according to an embodiment. As depicted in FIG. 1, system 100 includes end-hosts 105 and 135, network 110, stream-based multipath protocol (MPTCP) or Single path network 115, No anchor or Pass Through Path 118, router/anchor 120, and network 130.

In one embodiment, both end-hosts 105 and 135 are multi-homed end-hosts such as mobile devices (e.g., smartphones, tablets and the like). In another embodiment, one of end-hosts 105 and 135 is multi-homed. In another embodiment, both end-hosts 105 and 135 are conventional end-hosts, i.e., not multi-homed. End-hosts 105 and 135 also include respective communication interfaces 105-C and 135-C.

In one embodiment, network 110 includes a stream-based multipath protocol such as Multipath TCP (MPTCP), Multi-connection TCP (MCTCP) Concurrent Multipath Transfer SCTP (CMT SCTP) and the like. In various embodiments, network 110 comprises any of a WiFi, WLAN, 2.5G, 3G, 4G, LTE or other network. In particular, within the context of multi-homed embodiments such as discussed herein, other network 110 represent a second or other-homed connectivity mechanism for the host. In another embodiment, network 110 includes IPv4, IPv6 and the like. While primarily described within the context of a specific network facilitating traffic flows between one or more end-hosts associated with an Internet Protocol (IP) not supported by the source host, it will be appreciated by those skilled in the art that the invention is applicable to various transport protocol combination, such as facilitating traffic flows between a multipath or flow-based multihoming or mobility protocol.

Figure 3:
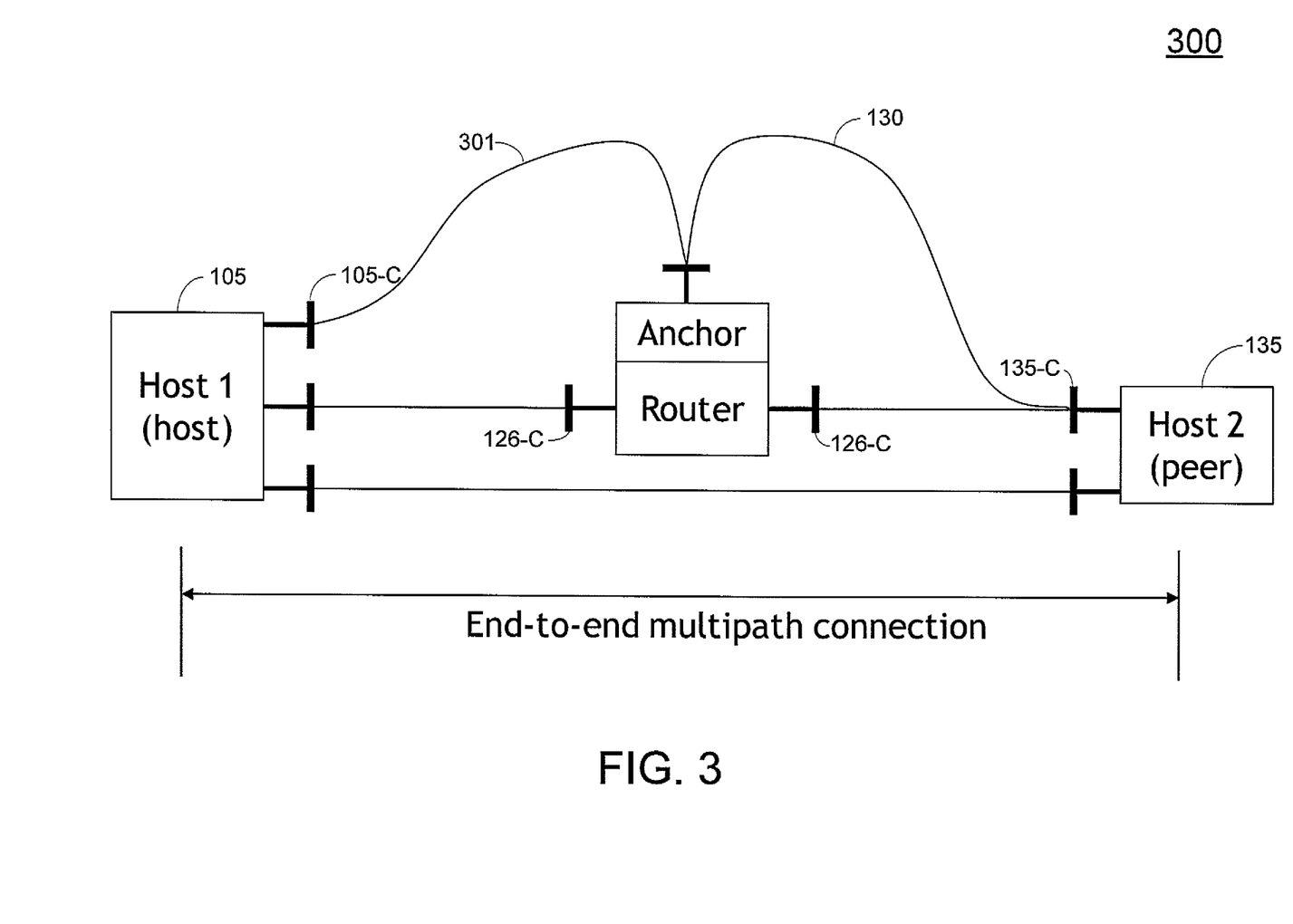
FIG. 3 depicts a graphical representation of end-to-end multipath connection with anchor function supporting end-to-end multipath connection according to an embodiment.

Network 130 is described in more detail in reference to FIG. 3.

The exemplary router/anchor 120 may support one or more of anchor functions, and other functions within a wired or wireless network environment. Exemplary router/anchor 120 is representative of one or more of a plurality of routing/switching elements within a communication system including a plurality of routing/switching elements of various types.

The exemplary router/anchor 120 includes a network interface 111 via which the exemplary router may communicate with other devices, which may include peer and non-peer devices. Although depicted as having a single network interface 111, it will be appreciated that exemplary router 120 may include any suitable number of network interfaces.

Generally speaking, the router/anchor 120 receives input traffic data from various input ports (not shown) from one or more prior network elements. The router 120 utilizes a switch fabric to route the input traffic data toward various output ports (not shown) for transmission toward next network elements.

Generally speaking, the exemplary router/anchor 120 is configured for supporting communication between host 105 and host 135-140 via networks 110 and 130 to adapt the operation of the switch fabric and/or the elements associated with the switch fabric.

As depicted in FIG. 1, exemplary router/anchor 120 includes I/O circuitry 121, a processor 122, and a memory 123. Processor 122 is adapted to cooperate with memory 123, I/O circuitry 121 and one or more communication interfaces 126-C to provide various anchor functions for the hosts.

I/O circuitry 121 is adapted to facilitate communications with peripheral devices both internal and external to processor 122. For example, I/O circuitry 121 is adapted to interface with memory 123. Similarly, I/O circuitry 121 is adapted to facilitate communications with Anchor Engine 124, and the like. In various embodiments, a connection is provided between processor ports and any peripheral devices used to communicate with a host.

Although primarily depicted and described with respect to Anchor Engine 124, it will be appreciated that I/O circuitry 121 may be adapted to support communications with any other devices suitable for providing the computing services associated with the relay content herein described.

Memory 123, generally speaking, stores data and software programs that are adapted for use in providing various computing functions within the communication system. The memory includes Anchor Engine 124 and Other Control Programs 125.

In one embodiment, Anchor Engine 124 is implemented using software instructions which may be executed by processor (e.g., controller 122) for performing the various functionalities depicted and described herein.

Although depicted and described with respect to an embodiment in which each of the engines is stored within memory 123, it will be appreciated by those skilled in the art that the engines may be stored in one or more other storage devices internal to router/anchor 120 and/or external to router/anchor 120. The engines may be distributed across any suitable numbers and/or types of storage devices internal and/or external to router/anchor 120. Memory 123, including each of the engines and tools of memory 123, is described in additional detail herein below.

As described herein, memory 123 includes Anchor Engine 124, which cooperates to provide the various anchor functions depicted and described herein. Although primarily depicted and described herein with respect to specific functions being performed by and/or using specific ones of the engines of memory 123, it will be appreciated that any of the anchor functions depicted and described herein may be performed by and/or using any one or more of the engines of memory 123.

In various embodiments, Anchor Engine 124 processes packet stream that arrive at the anchor's MPTCP receiver. In one embodiment, the router/anchor resides on one path of a multipath connection. For example, a central router on the access networks used by one of the hosts for one of the paths could house the instant router/anchor. The router/anchor may transparently derive connection-relevant information from inspection of passing packets because the anchor resides on one of the connection's path.

It is noted that the various communication interfaces 105-C, 126-C, 135-C and so on are selected or otherwise adapted to facilitate the various data and control signal interface, protocol, communication and/or transport functions described herein with respect to the various embodiments.

Figure 2:
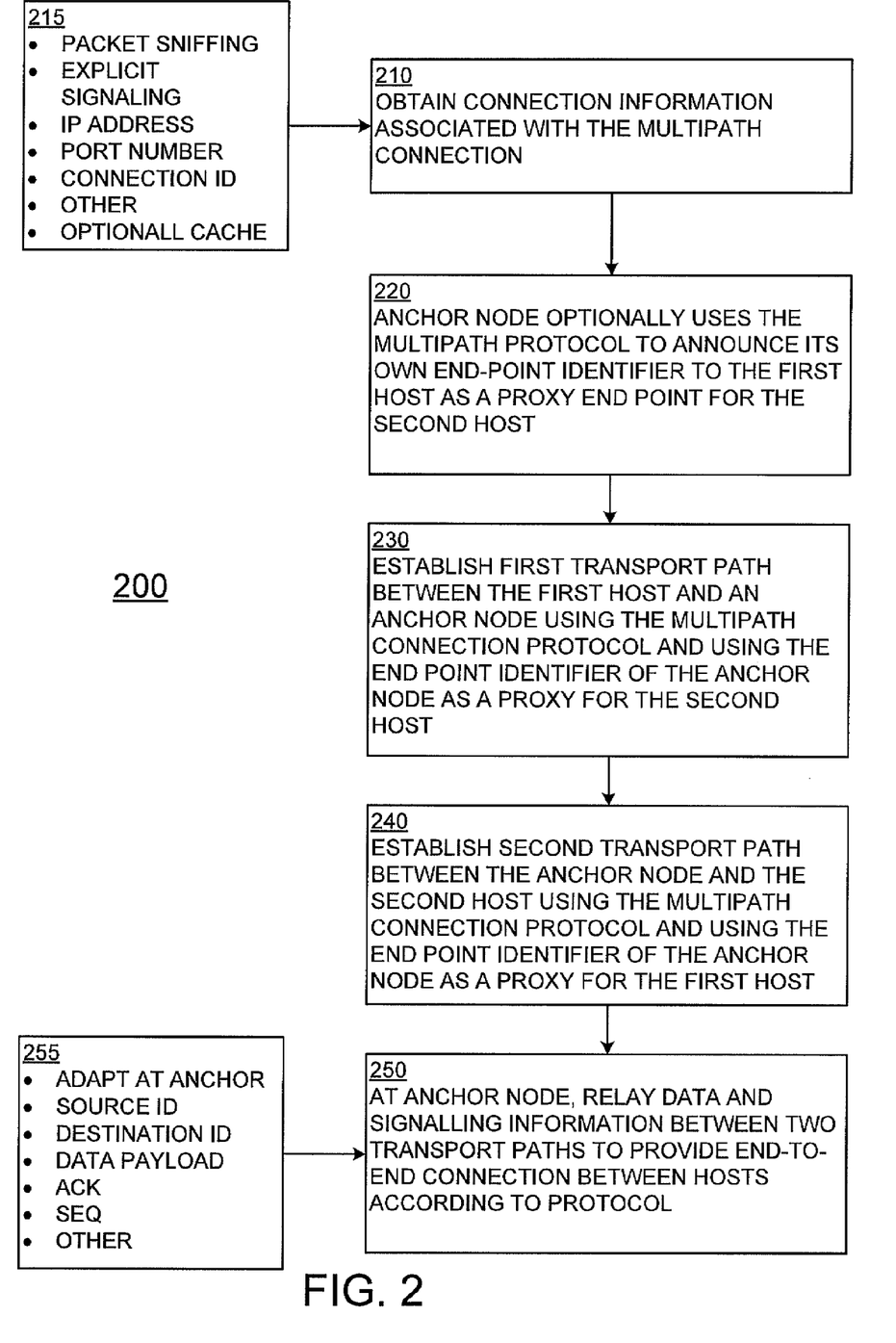
FIG. 2 depicts a flow diagram of a method for processing an incoming packet according to an embodiment.

FIG. 2 depicts a flow diagram of a method according to an embodiment. The embodiment of the method 200 of FIG. 2 contemplates two hosts communicating with each other via a multipath connection according to a multipath protocol. As noted herein, and anchor node or functionality may be included within a router to provide the anchor functions described herein.

For example, a router or network node not utilizing the anchor function simply routes packets in a standard manner between the first and second hosts, each of which operates as an endpoint of the multipath connection. A router or network node utilizing the anchor function (i.e., and anchor node) supports the multipath connection by implementing two separate transport connections; namely, a first transport connection between a first host endpoint and anchor node endpoint, and a second transport connection between an anchor node endpoint and a second host endpoint. In both cases, the multipath connection between the first and second hosts is maintained according to the multipath protocol.

At step 210 the anchor node obtains connection information associated with the multipath connection. Referring to box 215, the connection information may be obtained by packet sniffing (e.g., inspection of packets to extract therefrom connection information) or by explicit signaling (e.g., via an explicit signal received from a host or other network entity). The connection information may comprise an IP address information, port number information or other information associated with packets passing through the multipath connection. The connection information may also comprise a connection identifier (ID) associated with the multipath connection. Other information may also be obtained.

Optionally, the obtained connection information may be cached for future use, such as for mapping data packet flows, acknowledgment information flows and the like between various flows and/or sub flows of the multiple transport paths established to support multipath connection. It is noted that connection information may be obtained initially as well as obtained on an ongoing basis by packet sniffing, explicit signaling or other means.

At step 220, the anchor node optionally uses the multipath protocol to announce to other nodes its own end-point identifier, such as for use by the first host as a proxy endpoint for the second host.

At step 230, a first transport path is established between the first post and the anchor node using the multipath connection protocol and using the endpoint identifier of the anchor node as a proxy for the second host. This first transport path is typically established by the first host.

At step 240, a second transport path is established between the anchor node and the second host using the multipath connection protocol and using the endpoint identifier of the anchor node as a proxy for the first host. This second transport path is typically established by the anchor node in accordance with the needs of the first host.

At step 250, the anchor node operates to relate data and signaling information between the two transport paths to provide thereby end-to-end connection between the two hosts according to the multipath connection protocol.

Referring to box 255, the source ID and destination ID of a packet sent to the anchor node is adapted at the anchor node. For example, a packet sent by the first transport path will have a source ID associated with the first host and a destination ID associated with the anchor node. After adaptation of the packet to provide a source ID associated with the anchor node and a destination ID associated with second host, the packet will be transmitted to the second host via the second transport path. Optionally, data payload processing may be provided such as splitting payloads, combining payloads, routing payloads via different sub flows and so on. Optionally, ACK and/or SEQ information associated with the packets may be processed (e.g., incremented) to update sequence and/or acknowledgment information associated with traffic flows.

Traffic flows through the anchor node may be established or terminated by either host providing explicit signaling instructions to the anchor node. The anchor node responsively adapts either or both of the first and second transport paths.

FIG. 3 depicts a graphical representation of end-to-end multipath connection with anchor function supporting end-to-end multipath connection according to an embodiment. Specifically, packets sent by the host on path 301 during path establishment must contain the connection identifier supported by the multipath protocol for path establishment. Since the anchor has learned this connection identifier from the establishment of the path the anchor resides on, the anchor may associate the new path with the right connection and identify the peer. Consequently, the anchor establishes a path, referred to as path 130, from its own IP address to the peer. In this process, the anchor takes all information needed to establish path 130 with the peer from information it receives from the host during establishment of path 301, and vice versa. In this manner, a new end-to-end path consisting of path 301 concatenated with path 130 is established between host and peer via the anchor.

If the anchor did not advertise its IP address to the peer, the peer remains in the dark about the anchor's presence. To avoid such situation, in one embodiment the anchor advertises its IP address to both end hosts. In another embodiment, the anchor inserts information about its nature into the signaling used for establishing path 130. After establishment of the end-to-end path, all traffic packets sent by the host on 301 are forwarded by the anchor to the peer on path 130. In the forwarding process, the anchor rewrites the IP addresses and port numbers on the packets. All packets that return from the peer on path 130 are forwarded to path 301. Eventually, sequence numbers and acknowledgement number also have to be rewritten in these forwarding procedures. For these operations, the anchor holds minimal state information for each connection. For example, in one embodiment, the state information held by the anchor comprises connection identifiers, IP addresses and port numbers of the initial path the anchor resides on, IP addresses, port numbers and sequence number offsets of path 301 and IP addresses, port numbers and sequence number offsets of path 130. In another embodiment, other state information is held by the anchor.

Figure 4:
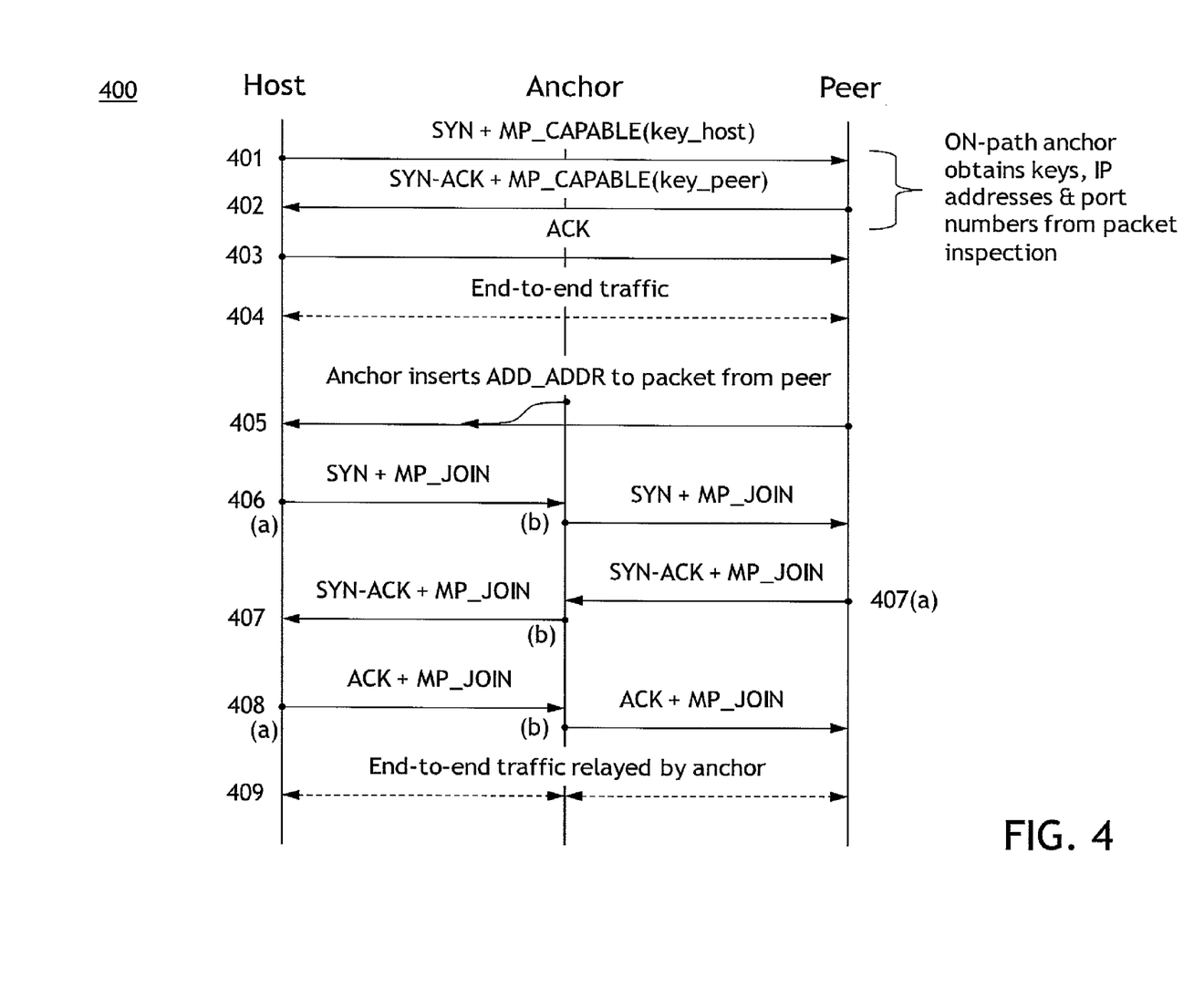
FIG. 4 depicts a handshake protocol suitable for use in the communication network of FIG. 1.

FIG. 4 depicts a handshake protocol suitable for use in the communication network of FIG. 1. In multipath protocol (MPTCP), each path used as part of the multipath connection is referred to as a "subflow". Each subflow appears as an independent Transmission Control protocol (TCP) connection on the wire, i.e., the subflow supports its own TCP signaling and sequence space. Further, all multipath signaling is inserted in band on TCP option headers. This avoids associating signaling messages with data paths.

At step 401, a source host 105 propagates toward a N end-host or peer 135 a SYN+MP_CAPABLE(key host) signal. At step 402, the end-host replies with a SYN-ACK+MP_CAPABLE(key peer) signal. At step 403, the source host acknowledges by forwarding ACK signal toward the end-host. At step 404, the end-to-end traffic ends. In one embodiment, an onpath anchor obtains keys, IP addresses and port numbers from packet inspection. Generally speaking, steps 401-400 operate to establish end-to-end traffic flow between the two hosts 105 and 135 in accordance with MPTCP. The traffic flow is depicted as traversing and anchor node 120, illustratively a router including the various anchor functions as described herein. MPTCP currently support the following:

(1) MP_CAPABLE options inserted in the SYN-flagged packets during establishment of the initial subflow of a connection. The MP_CAPABLE options exchange keys, from which the end hosts derive "tokens" used as connection identifiers during consecutive subflow establishment;

(2) MP_JOIN options inserted in the initial SYN, SYN-ACK and ACK packet used for establishment of additional subflows. These packets hold the token derived from a key, which allow the receiving end host to identify the corresponding connection; and (3) ADD_ADDR option used by a host to advertise alternative IP addresses (and eventually port numbers) it supports. This option also contains an address-ID which is a unique 1-byte number used as a referral to the IP address contained in this message.

In another embodiment where the anchor resides on the initial path of a connection, the anchor learns the keys provided by each end host in the MP_CAPABLE option. From each key, the anchor may produce the associated token in the same manner as done by the peer.

In yet another embodiment where the anchor resides on another path of a connection, which is not the initial path, the anchor learns the tokens directly from the MP_JOIN options contained in the SYN/ACK handshake. When the anchor decides to advertise its address to the end hosts of a particular connection, the anchor inserts an ADD_ADDR option to any data packet that is passed on this connection. If the path through the anchor is currently not used for data traffic, the anchor may forge an ACK packet with the ADD_ADDR option. This ACK packet has to carry the right sequence and acknowledgement numbers which the anchor may infer from prior packets that have passed on this subflow. In both cases, the anchor should provide information to the ADD_ADDR option that allows the receiving host to identify the address as an anchor address. For this purpose, the anchor may use a predetermined address-ID value reserved for anchors. This value is obviously not unique anymore, i.e., multiple anchors on the same path could use the same address-ID to different IP addresses. This, however, is of no concern since the address-ID is only needed for address deletion, which does not apply to anchor addresses. The host receiving the ADD_ADDR option caches the IP address (and eventually port number) together with the address-ID. Based on the value of the address-ID, it knows that the address belongs to an anchor.

MPTCP currently does not support a message to solicit address advertising. Such a message, referred to as SEEK_ADDR, could be easily introduced. This message should advantageously hold the IP protocol version number. By setting the corresponding field to zero, IP addresses to any IP protocol version would be acceptable.

When a host wishes to establish a new subflow to its peer via the anchor, the host selects an address it has cached together with an address-ID value pertaining to an anchor, and it starts subflow establishment in the conventional manner.

At step 405, the anchor or anchor function 120 inserts an ADD_ADDR signal to a new or existing data packet flowing on this connection.

At step 406(a), the host sends a SYN packet attached with MP_JOIN option and the peer's token to the anchor's address. Based on the peer's token, the anchor identifies the associated connection. At step 406(b), the anchor sends a SYN packet to the peer and copies the MP_JOIN option it received from the host onto this SYN packet. The anchor changes the address-ID on this MP_JOIN packet to the anchor address-ID.

At step 407(a), the peer returns a SYN-ACK packet carrying MP_JOIN option with the host's token. At step 407(b), the anchor sends a SYN-ACK packet to the host and copies the MP_JOIN option it received from the peer onto this packet. It changes the address-ID on this MP_JOIN packet to the anchor address-ID.

At step 408(a), the host sends an ACK packet with a MP_JOIN option to the anchor. At step 408(b), the anchor sends an ACK packet to the peer copying the MP_JOIN option from the packet it received from the host.

At step 409, end-to-end traffic is relayed by the anchor between the two transport paths communicating with the hosts such that end-to-end traffic is conveyed between the hosts in a manner compliant with the protocol.

It will be appreciated by those skilled in the art that the various embodiments described herein with respect to any particular protocol, such as multipath protocol (MPTCP), may be readily adapted by those skilled in the art for use with other protocols.

Figure 5:
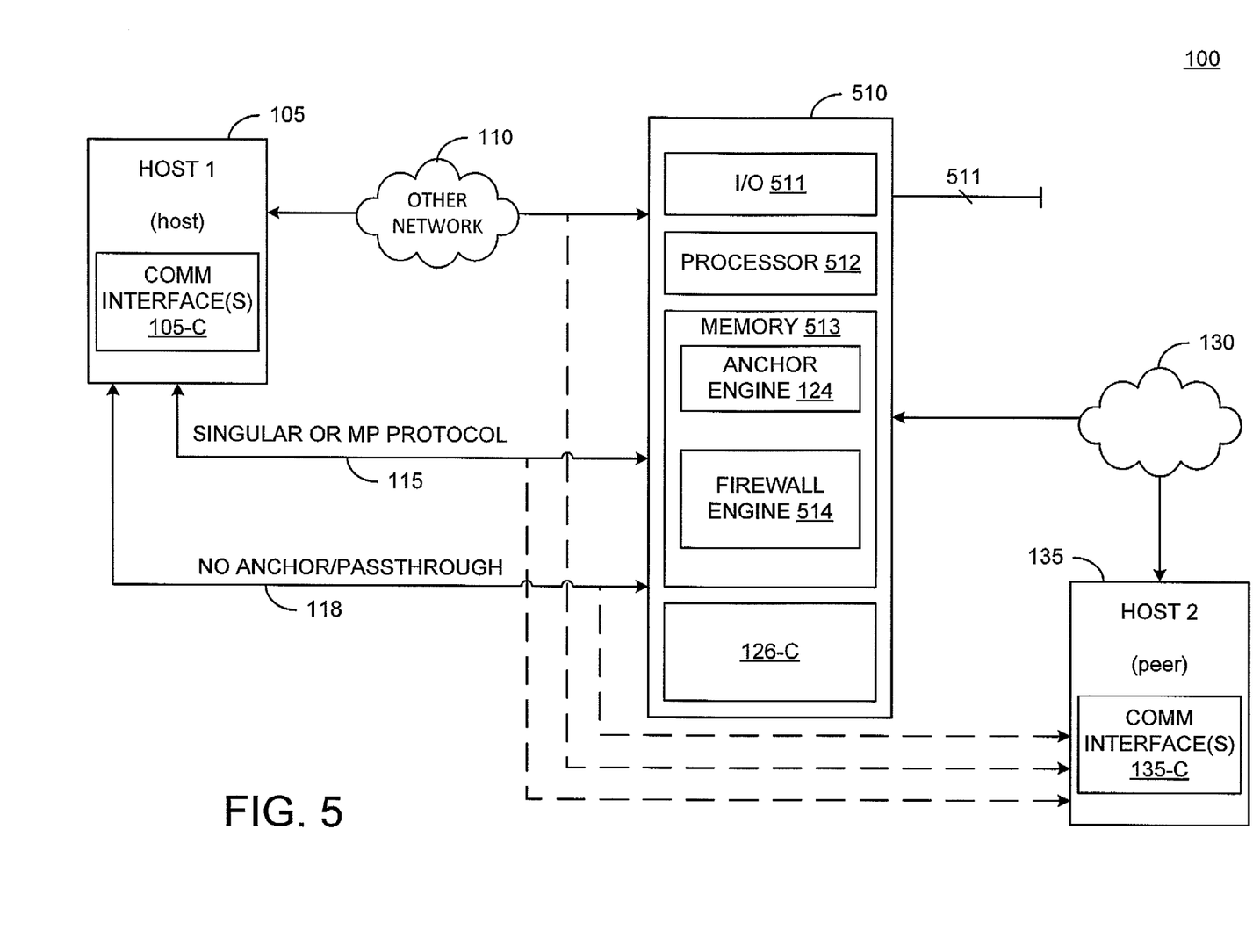
FIG. 5 depicts a high-level block diagram of an apparatus including an exemplary firewall and anchor function benefiting from an embodiment.

FIG. 5 depicts a high-level block diagram of an apparatus including an exemplary firewall and anchor function benefiting from an embodiment. The exemplary firewall 510 may support one or more of firewall functions, anchor functions, and other functions within a wired or wireless network environment. Exemplary firewall 510 is representative of one or more of a plurality of network elements within a communication system including a plurality of network elements of various types.

The exemplary firewall 510 includes a network interface 511 via which the exemplary firewall may communicate with other devices, which may include peer and non-peer devices. Although depicted as having a single network interface 511, it will be appreciated that exemplary firewall 510 may include any suitable number of network interfaces.

Generally speaking, the firewall 510 receives input traffic data from various input ports (not shown) from one or more prior network elements.

As depicted in FIG. 1, exemplary firewall 510 includes I/O circuitry 511, a processor 512, and a memory 513. Processor 512 is adapted to cooperate with memory 513, I/O circuitry 511 and one or more communication interfaces 126-C to provide various relay functions for the hosts.

I/O circuitry 511 is adapted to facilitate communications with peripheral devices both internal and external to processor 512. For example, I/O circuitry 511 is adapted to interface with memory 513. Similarly, I/O circuitry 511 is adapted to facilitate communications with Anchor Engine 124, Firewall Engine 514 and the like. In various embodiments, a connection is provided between processor ports and any peripheral devices used to communicate with a host.

Although primarily depicted and described with respect to Anchor Engine 124, Firewall Engine 514 it will be appreciated that I/O circuitry 511 may be adapted to support communications with any other devices suitable for providing the computing services associated with the relay content herein described.

Memory 513, generally speaking, stores data and software programs that are adapted for use in providing various computing functions within the communication system. The memory includes Anchor Engine 124 and Firewall Engine 514.

In one embodiment, Anchor Engine 124 is implemented using software instructions which may be executed by processor (e.g., controller 122) for performing the various functionalities depicted and described herein.

In another embodiment, Anchor Engine 124 is implemented using hardware.

Although depicted and described with respect to an embodiment in which each of the engines is stored within memory 123, it will be appreciated by those skilled in the art that the engines may be stored in one or more other storage devices internal to firewall 510 and/or external to firewall 510. The engines may be distributed across any suitable numbers and/or types of storage devices internal and/or external to firewall 510. Memory 513, including each of the engines and tools of memory 513, is described in additional detail herein below.

As described herein, memory 513 includes Anchor Engine 124, which cooperates to provide the various anchor functions depicted and described herein. Although primarily depicted and described herein with respect to specific functions being performed by and/or using specific ones of the engines of memory 513, it will be appreciated that any of the anchor functions depicted and described herein may be performed by and/or using any one or more of the engines of memory 513.

In various embodiments, Anchor Engine 124 processes packet stream that arrive at the anchor's MPTCP receiver. In one embodiment, the firewall resides on one path of a multipath connection. For example, a central router on the access networks used by one of the hosts for one of the paths could house the instant firewall. The anchor may transparently derive connection-relevant information from inspection of passing packets because the anchor resides on one of the connection's path.

Figure 6:
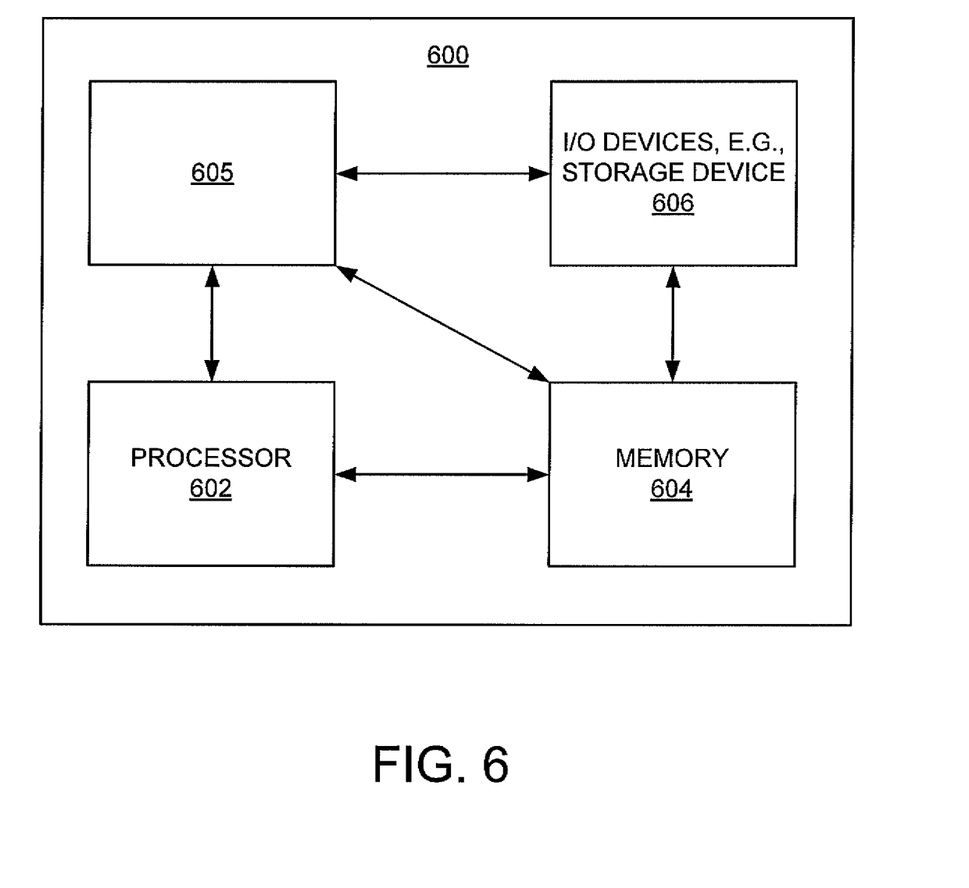
FIG. 6 depicts a high-level block diagram of a computing device suitable for use in implementing various functions described herein.

FIG. 6 depicts a high-level block diagram of a computer suitable for use in performing functions described herein.

As depicted in FIG. 6, computer 600 includes a processor element 602, (e.g., 122, 512, a central processing unit (CPU) and/or other suitable processor(s)), a memory 604 (e.g., 123, 513, random access memory (RAM), read only memory (ROM), and the like), a cooperating module/process 705, and various input/output devices 606 (e.g., 121, 511, a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in software and/or hardware, e.g., using a general purpose computer, one or more application specific integrated circuits (ASIC), and/or any other hardware equivalents. In one embodiment, the cooperating process 605 may be loaded into memory 604 and executed by processor 602 to implement the functions as discussed herein. Thus, cooperating process 605 (including associated data structures) may be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, and/or stored within a memory within a computing device operating according to the instructions.

Although various embodiments which incorporate the teachings of the present invention have been shown and described in detail herein, those skilled in the art may readily devise many other varied embodiments that still incorporate these teachings.

What is claimed is:

1. A method for anchoring a multipath connection between a first host outside a firewall and a second host inside the firewall, the method comprising:
    obtaining connection information associated with the multipath connection;
    establishing a first transport path between the first host and an anchor node outside of the firewall using the multipath connection protocol and using the end point identifier of the anchor node as a proxy for the second host;
    establishing a second transport path between the anchor node and the second host using the multipath connection protocol and using the end point identifier of the anchor node as a proxy for the first host; and
    relaying data and signaling information between the first and second transport paths, said relaying including adapting each packet received via one transport path to include a source ID associated with the anchor node and a destination ID associated with the host connected to the anchor node via the other transport path, and transmitting said adapted packet via the other transport path.

2. The method of claim 1, wherein the anchor node uses the multipath protocol to announce its own end-point identifier to the first host as a proxy end point for the second host.

3. The method of claim 1, wherein the step of establishing a second transport path is performed by the anchor node in response to the first host establishing the first transport path.

4. The method of claim 1, wherein the connection information is obtained by monitoring one path of the multipath connection.

5. The method of claim 1, wherein the connection information is obtained by examining packets associated with one host.

6. The method of claim 1, wherein the connection information is obtained by explicit signaling initiated by one of the hosts.

7. The method of claim 1, wherein the connection information comprises one or more of IP address, port number and connection identifier information.

8. The method of claim 1, further comprising caching the obtained connection information.

9. The method of claim 1, wherein said relaying comprises:
receiving packets addressed to the anchor node via a flow or sub flow created by a source host;
adapting the packets to identify the anchor node as a packet source and a destination host as a packet destination; and
transmitting the packets toward the destination host via a flow or sub flow between the anchor node and the destination host.

10. The method of claim 9, further comprising adapting the packets to add an offset to any SEQ and ACK numbers.

11. The method of claim 1, further comprising:
in response to one host establishing a new flow between the one host and the anchor node, establishing via the anchor node a new flow between the anchor node and the other host.

12. The method of claim 11, wherein the new flow between the anchor node and the other host is included within the second transport path.

13. The method of claim 1, further comprising:
in response to the first host establishing a new transport path between the first host and the anchor node, routing packets between the first host and second host via the new transport path and the second transport path.

14. The method of claim 1, wherein anchored multipath connection comprises a flow-based multipath protocol connection.

15. The method of claim 1, wherein said anchored multipath connection comprises a flow-based multihoming protocol connection.

16. The method of claim 1, wherein said anchored multipath connection comprises a mobility protocol connection.

17. The method of claim 16, further comprising:
in response to a determination that said flow of said mobility protocol connection has been interrupted between said anchor node and one of said hosts, establishing a replacement transport path between said anchor node said one of said hosts.

18. The method of claim 1, wherein said relaying further includes adapting sequence information of the packet to be transmitted by the other transport path.

19. The method of claim 1, wherein said relaying function further includes adapting any acknowledgment information of the packet to be transmitted by the other transport path.

20. The method of claim 1, wherein said connection information is obtained using said firewall.

21. The method of claim 13, wherein the firewall resides on the new transport path and wherein a trusted session is established using said new transport path.

22. A non-transitory computer readable medium including software instructions which, when executed by a processer, adapt the processor to perform a method for anchoring a multipath connection between a first host outside a firewall and a second host inside the firewall, the method comprising:
obtaining connection information associated with the multipath connection;
establishing a first transport path between the first host and an anchor node outside the firewall using the multipath connection protocol and using the end point identifier of the anchor node as a proxy for the second host;
establishing a second transport path between the anchor node and the second host using the multipath connection protocol and using the end point identifier of the anchor node as a proxy for the first host; and
relaying data and signaling information between the first and second transport paths, said relaying including adapting each packet received via one transport path to include a source ID associated with the anchor node and a destination ID associated with the host connected to the anchor node via the other transport path, and transmitting said adapted packet via the other transport path.

23. An apparatus for anchoring a multipath connection between a first host outside a firewall and a second host inside the firewall, the apparatus comprising a processor adapted to:
obtain connection information associated with the multipath connection;
establish a first transport path between the first host and an anchor node outside the firewall using the multipath connection protocol and using the end point identifier of the anchor node as a proxy for the second host;
establish a second transport path between the anchor node and the second host using the multipath connection protocol and using the end point identifier of the anchor node as a proxy for the first host; and
relay data and signaling information between the first and second transport paths, wherein each packet received via one transport path is adapted to provide a source ID associated with the anchor node and a destination ID associated with the host connected to the anchor node via the other transport path.

24. The apparatus of claim 23, wherein the processor is further adapted to implement the firewall, the firewall residing on at least one path of the multipath connection.

25. The apparatus of claim 24, wherein said connection information is obtained using said firewall.

26. The apparatus of claim 25, wherein the first host and anchor node are external to the firewall and the second host is internal to the firewall.

* * * * *